United States Patent [19]

Heath et al.

[11] Patent Number: 4,854,876

[45] Date of Patent: Aug. 8, 1989

[54] AIRCRAFT CARRIER SIMULATOR AND METHOD

[76] Inventors: William W. Heath, 3077 Gibraltar, Costa Mesa, Calif. 92626; John C. Cole, P.O. Box 94, Tyler, Tex. 75710-0094

[21] Appl. No.: 108,240

[22] Filed: Oct. 13, 1987

[51] Int. Cl.$^4$ ............................................... G09B 9/08
[52] U.S. Cl. ......................................... 434/29; 434/55
[58] Field of Search ................................. 434/29, 55

[56] References Cited

U.S. PATENT DOCUMENTS

| | | | |
|---|---|---|---|
| 3,486,242 | 12/1969 | Aronson | 434/29 |
| 4,431,183 | 2/1984 | Reimann | 434/29 |
| 4,753,596 | 6/1988 | Hart et al. | 434/29 |

Primary Examiner—Leo P. Picard
Attorney, Agent, or Firm—Lynn & Lynn

[57] ABSTRACT

The present invention is an improved facility for training personnel for aircraft carrier flight operations. The invention provides a solution to problems caused by flight training operations in populated areas. The invention provides an aircraft carrier simulator that includes a land-based full scale flight deck. The simulator includes apparatus for moving the deck to simulate the motion of a carrier in the ocean. The deck may be moved up and down and rotated to simulate the pitching and rolling motion of a carrier floating in the ocean. The deck may also be rotated 360° about its vertical centerline so that flight operations may be conducted at any desired angle to the wind. The simulator is capable of providing all training for pilots and aircraft crews and deck training for fire, crash, battle station, flight mechanics, flight, R&D AIMD, fuel and LOX crews. The simulator also can provide training for ship crew personnel for radio communications, radar, guidance, ordnance, engineers, mess, command and control, and surgical and medical teams.

22 Claims, 7 Drawing Sheets

AIRCRAFT CARRIER SIMULATOR AND METHOD

BACKGROUND OF THE INVENTION

This invention relates generally to apparatus and methods for training personnel for conducting operations on an aircraft carrier. The invention particularly relates to apparatus and methods for simulating on land the operational conditions of an aircraft carrier for training pilots and other personnel.

For many years the air components of the United States military forces have faced heavy civilian population growth in the vicinity of military airfields. As the population around an airfield grows, the possible damage caused by a crash increases. The noise level associated with flight operations both during the day and night hours causes conflict between civilian and military interests.

The problems of operating military aircraft near areas having large civilian populations are of particular importance at sites used for training pilots. Pilots training requires a large number of takeoffs and landings under all weather conditions and at all times of day. One particularly difficult situation involves training pilots for operations from aircraft carriers. For example, at Whidbey Island in the state of Washington, A-6 and EA-6 aircraft train for day and night carrier landings at a field carrier landing practice (FCLP) air field. Air crews must train from day and night carrier landings by flying in repetitive touch down and take off patterns. The patience and understanding of civilian neighbors wears thin when such practice must continue into the night and early morning hours.

There is, therefore, a need to look for new ways for training personnel and maintaining a high state of readiness while minimizing the exposure of the population of the noise of flight operations.

SUMMARY OF THE INVENTION

The present invention is an improved facility for training personnel for aircraft carrier flight operations. The invention provides a solution to problems caused by flight training operations in populated areas and provides a training facility that can increase the battle readiness of the U.S. Naval Air component.

The invention provides an aircraft carrier simulator that includes a land-based full scale flight deck. The simulator includes apparatus for moving the deck to simulate the motion of a carrier in the ocean. The deck may be moved up and down and rotated about either its longitudinal axis or a line in the plane of the deck and perpendicular to the longitudinal axis. This capability of moving the deck permits simulation of the pitching and rolling motion of a carrier floating in the ocean. The deck may also be rotated 360° about its vertical centerline so that flight operations may be conducted at any desired angle to the wind.

The naval carrier battle simulator and landing deck preferably are built in isolated areas where there is no civilian population. For example, the U.S. government owns Smith Island, which is an unpopulated island about seven miles off the west coast of North Whidbey Island. The simulator could be built on Smith Island, and the majority of field carrier landing practice operations could be conducted there. Use of the simulator at Smith Island would relieve the heavy use of the practice field at Coupeville on Whidbey Island and reduce both accident potential and public exposure to aircraft noise. Placing the simulator on Smith Island would be in accord with Department of Defense plans to reduce accident potential and noise impacts around air fields and would allow the Naval Air Station Whidbey Island to meet many of the objectives for public safety, health and welfare and noise exposure reduction.

The simulator of the present invention would allow for increased readiness of the active naval air forces and for higher proficiency of the naval air reserve units. Deck and ship crews could receive advanced individual training and specialty training on the simulator. Personnel could practice carrier operations in an environment that closely simulates that of an actual aircraft carrier without the cost of operating an aircraft carrier.

The invention has the added advantage of freeing carriers for operational purposes instead of training purposes. This is a particularly important consideration in the cost of training personnel and obtaining the most efficient use of expensive equipment.

The invention also would allow the navy to maintain a level of security that is not feasible on land based facilities located near civilian communities.

The simulator is capable of providing all training for pilots and aircraft crews and deck training for fire, crash, battle station, flight mechanisms, flight R&D AIMD, fuel and LOX crews. The simulator also can provide training for ship crew personnel for radio communications, radar, guidance, ordnance, engineers, mess, command and control, and surgical and medical teams.

An aircraft carrier flight deck simulator according to the invention comprises a slab of a substantially rigid material having a generally elongate rectangular surface thereon marked to define a first runway portion where aircraft may be launched into flight and marked to define a second runway portion where aircraft may land as on an aircraft carrier, means for supporting the slab such that the slab may be rotated in a substantially horizontal plane, and means for selectively elevating and lowering portions of the slab to simulate pitch and rolling motions of an aircraft carrier afloat at sea The slab is preferably formed of reinforced concrete.

The means for supporting the slab such that it may be rotated in a substantially horizontal plane preferably comprises a foundation ring formed as a generally circular track, and means mounted between the slab and the foundation ring for supporting the slab and moving it along the track. The support means preferably includes a plurality of concentric foundation rings; and apparatus mounted between each foundation ring and the slab for supporting the slab upon the foundation rings.

The means for selectively elevating and lowering portions of the slab includes a plurality of hydraulic cylinders arranged to support the weight of the slab, and means for controlling the hydraulic pressure in each of the plurality of hydraulic cylinders. The controlling means preferably includes a flight deck control central processing unit and a plurality of pumps arranged so that each of the plurality of hydraulic cylinders is connected to a corresponding one of the plurality of pumps.

DESCRIPTION OF THE PREFERRED EMBODIMENT

FIGS. 1-4 illustrate an aircraft carrier simulator 10 according to the invention. The aircraft carrier simulator 10 includes a flight deck 12 having a plurality of areas 14-17 where aircraft may be launched into flight such as from an aircraft carrier at sea. The deck 12 also includes an area 20 where aircraft may land. The deck 12 may be any desired configuration, but it is preferably formed as a full scale model of an actual aircraft carrier flight deck. Accordingly, the deck 12 is preferably about 1100 feet long and 270 feet wide at its widest point. The flight deck 12 preferably is formed of reinforced concrete and has a thickness of about eight inches.

The deck 10 also preferably includes elevators 22-25 for moving aircraft between the deck 10 and positions below it. The deck 12 also preferably includes a fully operational flight control tower 30 shown in FIGS. 1-4.

Figure 1:
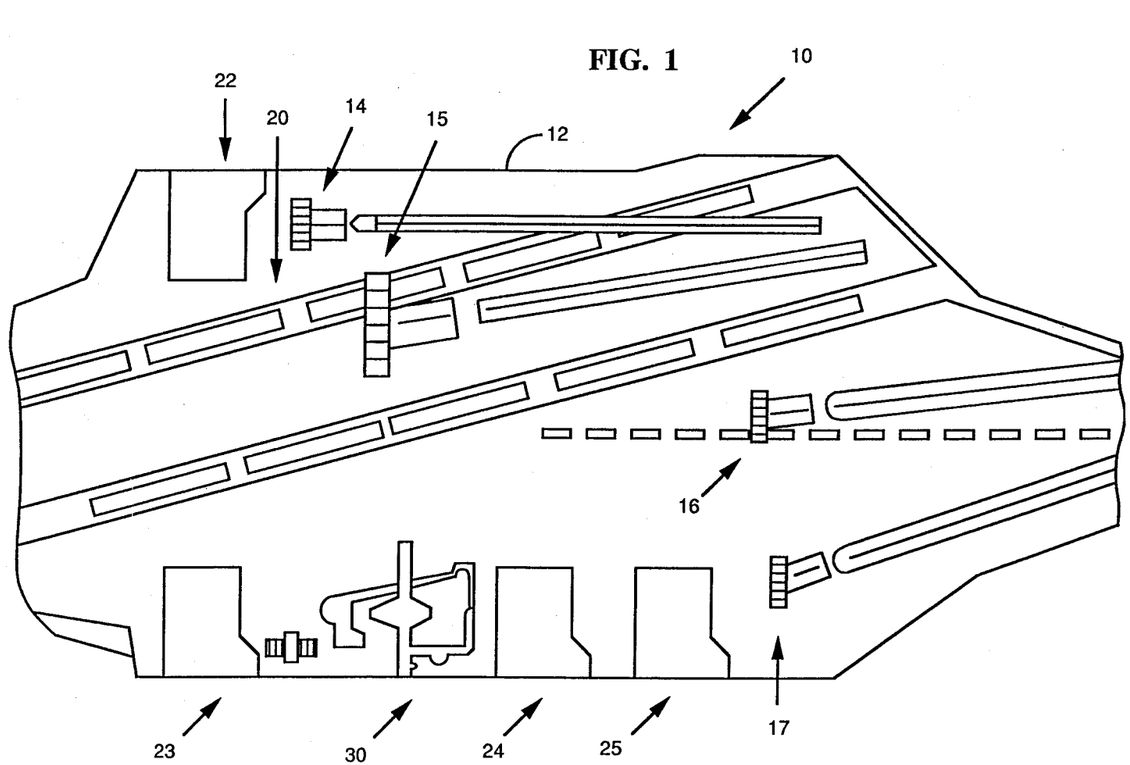
FIG. 1 is a plan view of an aircraft flight deck.
Figure 2:
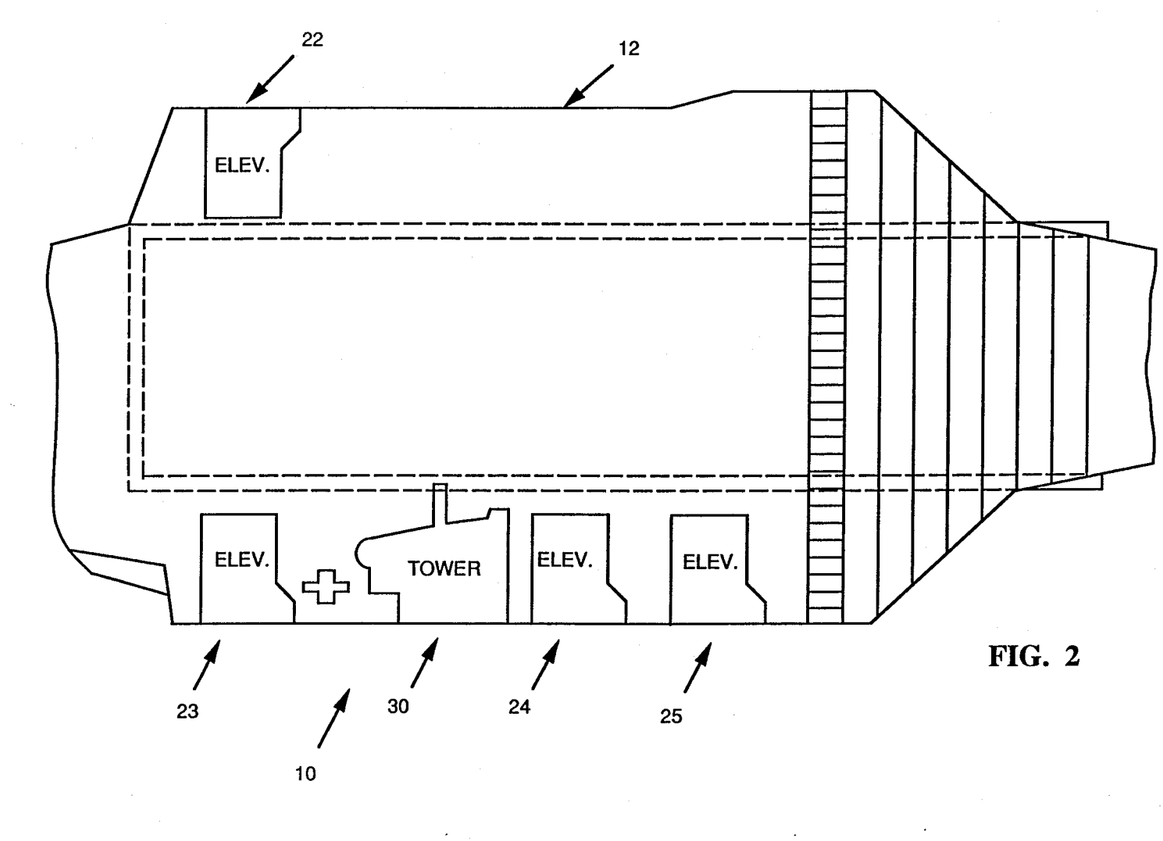
FIG. 2 is a plan view of a framing plan for the aircraft flight deck of FIG. 1.
Figure 3:
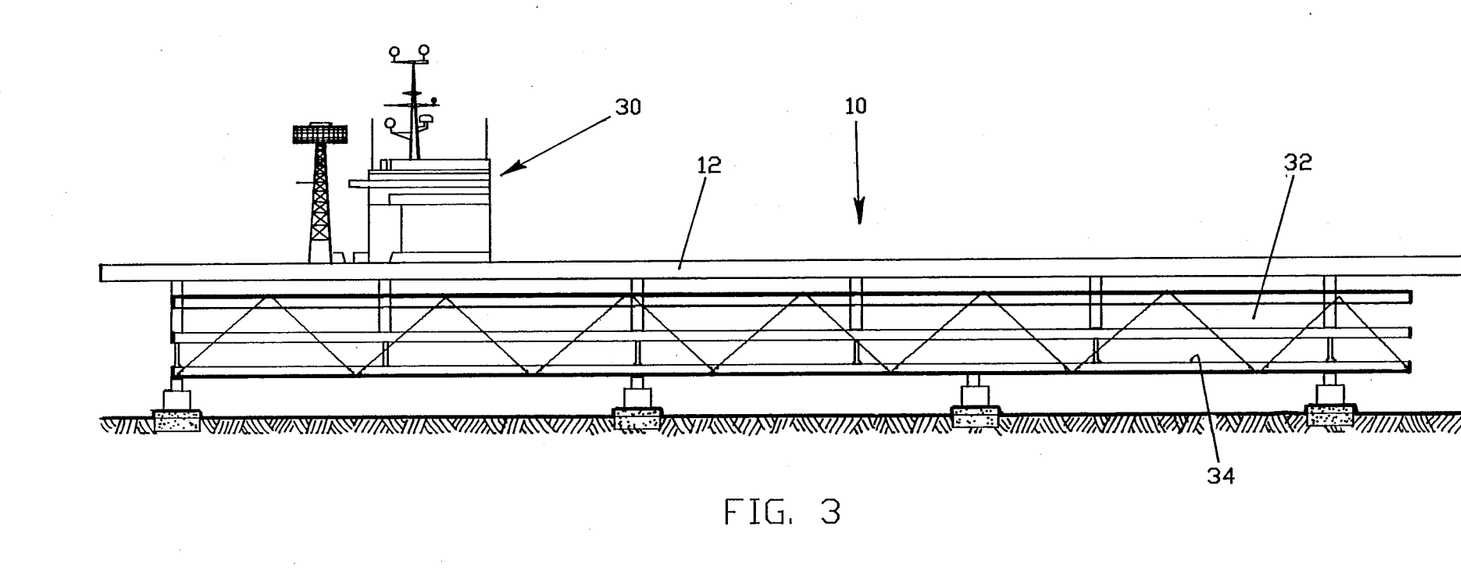
FIG. 3 is a side elevation view of the aircraft flight deck of FIG. 1 showing apparatus for supporting and moving the deck.

Referring to FIG. 3, the aircraft carrier simulator 10 preferably includes a hangar bay 32 and a training deck 34 located below the flight deck 12. Nearly all crew training activities for an aircraft carrier may be conducted using the aircraft carrier simulator 10.

Figure 4:
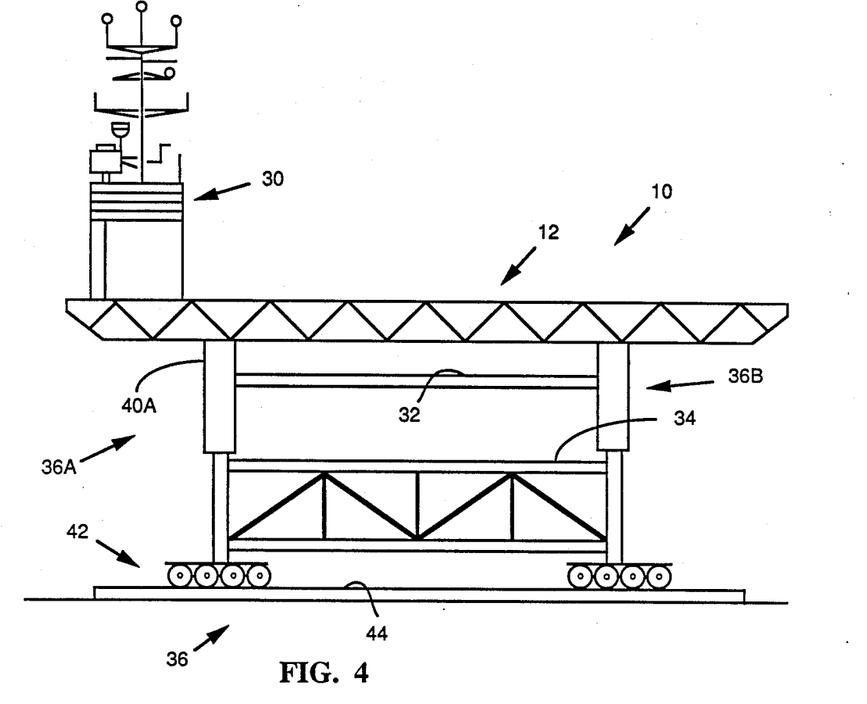
FIG. 4 is an end elevation view of the aircraft flight deck and apparatus of FIG. 3.
Figure 6:
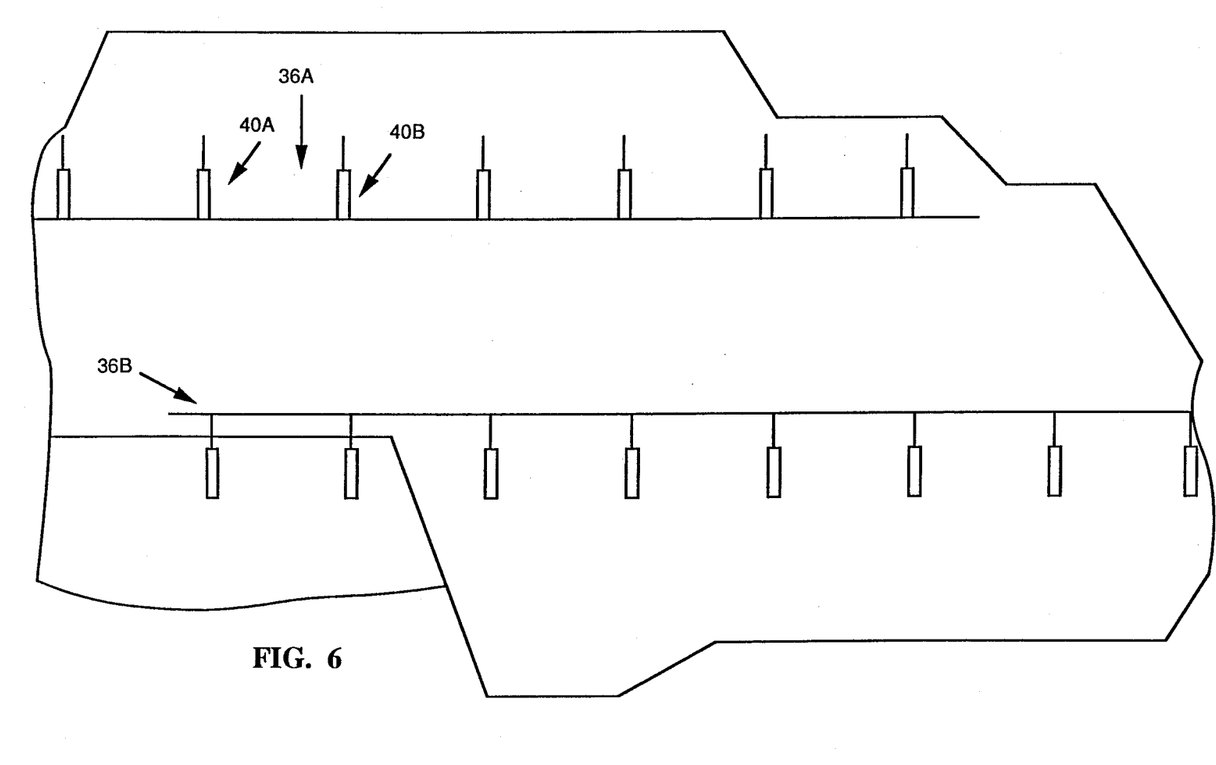
FIG. 6 is an isometric view showing the arrangement of a plurality of hydraulic actuators like that shown FIG. 5.

Still referring to FIG. 3, the flight deck 12 is supported upon a support structure 36 that preferably includes a plurality of hydraulic cylinders 40A, 40B etc. As shown in FIGS. 3, 4 and 6 the hydraulic cylinders are preferably arranged in two parallel rows 36A and 36B with each row including six to eight cylinders. The number of cylinders used depends upon the load that each cylinder may safely support and design considerations such as wind force the structure is to withstand, etc. The simulator 10 is preferably constructed to withstand a wind speed of 200 mph from any direction.

Referring to FIGS. 3 and 4, the cylinders each have an upper end mounted to the deck 12 and a lower end mounted to a roller assembly 42. Each roller assembly 42 is mounted on a circular track 44. Each roller assembly includes a drive motor that moves the roller assembly 42 along its track 44. The aircraft carrier simulator 10 may therefore be rotated 360° in a horizontal plane so that flight training operations may be conducted at any desired orientation relative to the wind.

Figure 5:
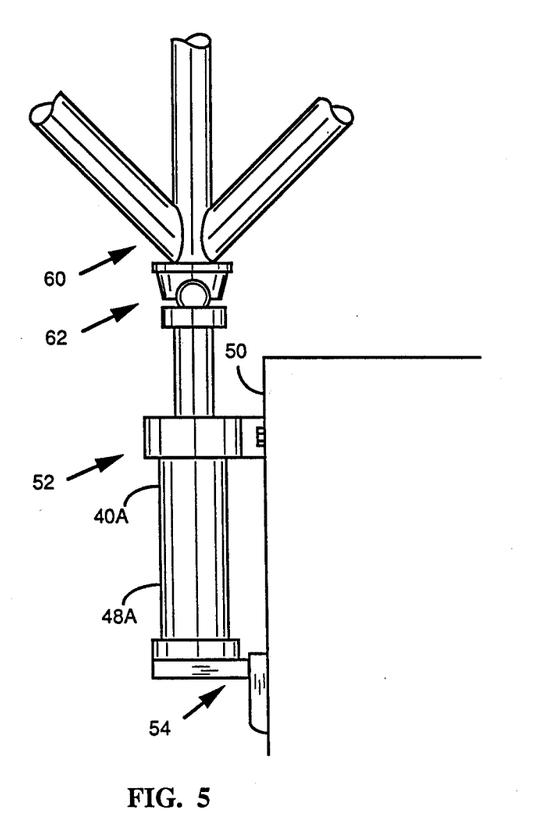
FIG. 5 illustrates a hydraulic actuator that may be included in the apparatus of FIGS. 3 and 4 for supporting and moving the aircraft flight deck.

Referring to FIG. 5, the hydraulic cylinder 40A preferably includes a cylinder housing 48 that is mounted to a bulkhead 50 via a pair of brackets 52 and 54. The bulkhead 50 is connected to the roller assembly 42. A rod 56 extends out of the housing 48 and is connected to a truss 60 that is preferably used to support the deck 12. Any convenient means for connecting the rod 56 to the truss 60 may be used, however, a ball and socket joint 62 preferably is used to make the connection. Moving the deck 12 to vary its angle relative to the horizontal plane changes the angle of the rod 56 hydraulic cylinder 40A and the deck 12. Therefore, the ball and socket joint or the equivalent is necessary to permit the desired movement of the deck 12 and preserve the structural integrity of the aircraft carrier simulator 10.

Figure 7:
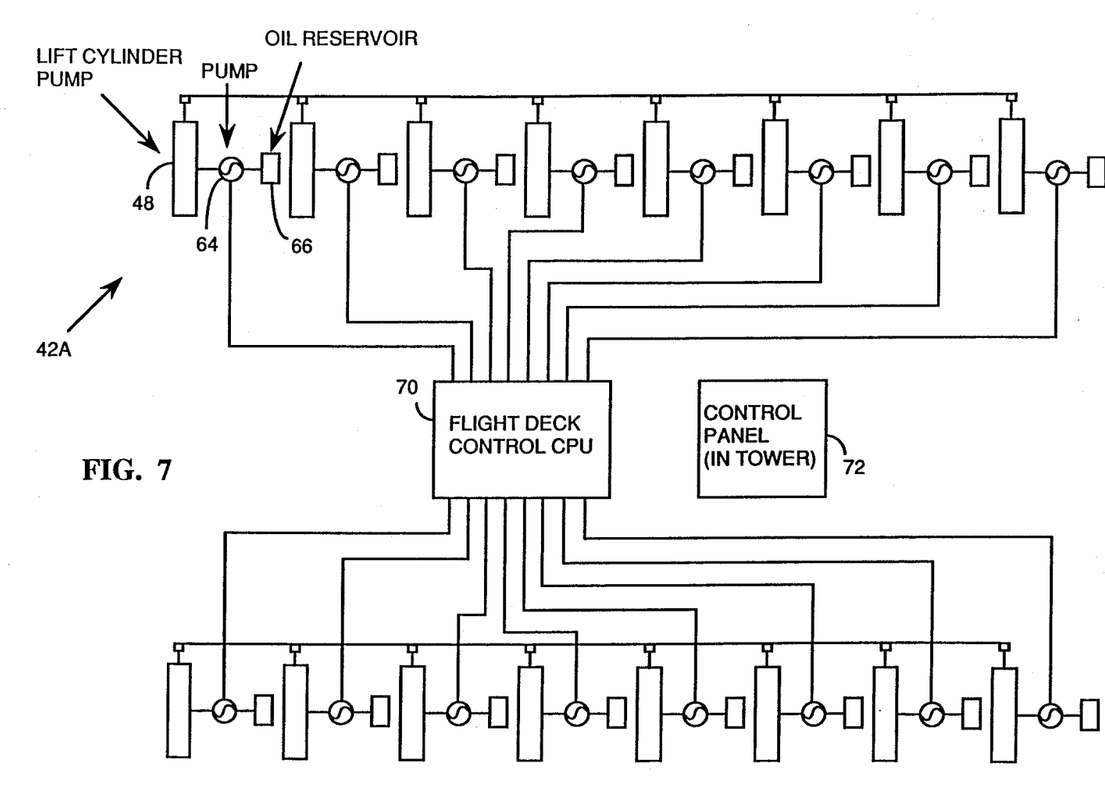
FIG. 7 is a block diagram of apparatus for controlling the plurality of actuators of FIG. 6.

FIG. 7 illustrates apparatus for controlling the hydraulic cylinders 40A, 40B, etc. Each of the hydraulic cylinders 40A, 40B, etc. is connected to a flight deck control central processing unit (CPU) 70. Instructions may be input to the (CPU) 70 via a control panel 72 located in the tower 30.

All of the hydraulic cylinders 40A, 40B, etc. have essentially identical control mechanisms. Therefore only the control mechanism for the hydraulic cylinder 40A is described herein. A pump 64 is connected between the housing 48 and an oil reservoir 66. The pump receives control signals from the (CPU) 70 when the rod 56 is to be moved with respect to the housing 48. The pump controls the distribution of oil between the housing 48 and the reservoir.

Identical inward or outward movement of the rods in the row 36A of hydraulic cylinders causes the deck 12 to have a rolling motion. While the rods in the row 36A move in one direction, the rods in the hydraulic cylinders in row 36B may be moved in the opposite direction to cause the deck 12 to roll about its longitudinal centerline in much the same manner as an aircraft carrier having waves impinging at right angles upon one of its sides.

The deck 12 may also be moved to simulate the pitching motion of an aircraft carrier at sea. The rods in the cylinders at one end of the rows 36A and 36B may be moved out a predetermined distance while the rods at the other end are moved inward. The rods between the ends of the rows are moved in or out as necessary to maintain an even weight distribution and tilt the deck 10 about an axis that is perpendicular to the longitudinal axis. It is not necessary to move the rods at the opposite ends by equal and opposite distances. If the distances are exactly opposite, the pitch axis is through the center of the deck. If the distances that the rods at opposite ends move are not opposite, the pitch axis will still be perpendicular to the longitudinal axis, but not through the middle of the deck. Both pitch and roll may be about selected axes other than the lines through the center of the deck to simulate the movement of a carrier at sea. For example, a large wave striking the bow of a carrier could both lift the deck and cause it to pitch.

What is claimed is:

1. An aircraft carrier flight deck simulator for training pilots in aircraft carrier takeoff and landing procedures, comprising:

a slab of a substantially rigid material having a generally elongate rectangular surface thereon marked to define a first runway portion where an aircraft may be launched into flight and marked to define a second runway portion where the aircraft may land as on an aircraft carrier;

means for supporting the slab such that the slab may be rotated in a substantially horizontal plane; and means for selectively elevating and lowering portions of the slab to simulate pitch and rolling motions of an aircraft carrier afloat at sea.

2. The aircraft carrier flight deck simulator of claim 1 wherein the slab is formed of reinforced concrete.

3. The air carrier flight deck simulator of claim 1 wherein the means for supporting the slab such that the slab may be rotated in a substantially horizontal plane comprises:
   a foundation ring formed as a generally circular track; and
   means mounted between the slab and the foundation ring for supporting the slab and moving it along the track.

4. The aircraft carrier flight deck simulator of claim 3 including:
   a plurality of concentric foundation rings; and
   support means mounted between each foundation ring and the slab for supporting the slab upon the foundation rings.

5. The aircraft carrier flight deck simulator of claim 1 wherein the means for selectively elevating and lowering portions of the slab includes:
   a plurality of hydraulic cylinders arranged to support the weight of the slab; and
   means for controlling the hydraulic pressure in each of the plurality of hydraulic cylinders.

6. The aircraft carrier flight deck simulator of claim 5 wherein the controlling means includes:
   a flight deck control central processing unit; and
   a plurality of pumps arranged so that each of the plurality of hydraulic cylinders is connected to a corresponding one of the plurality of pumps.

7. A method for forming an aircraft carrier flight deck simulator for training pilots in aircraft carrier takeoff and landing procedures, comprising the steps of:
   forming a slab of a substantially rigid material having a generally elongate rectangular surface thereon marked to define a first runway portion where aircraft may be launched into flight and marked to define a second runway portion where aircraft may land as on an aircraft carrier;
   supporting the slab such that the slab may be rotated in a substantially horizontal plane; and
   selectively elevating and lowering portions of the slab to simulate pitch and rolling motions of an aircraft carrier afloat at sea.

8. The method of claim 7 including the step of forming the slab of reinforced concrete.

9. The method of claim 7 wherein the step of supporting the slab such that the slab may be rotated in a substantially horizontal plane comprises the steps of:
   forming a foundation ring as a generally circular track; and
   supporting the slab and moving it along the track with means mounted between the slab and the foundation ring.

10. The aircraft carrier flight deck simulator of claim 9 including the steps of:
    forming a plurality of concentric foundation rings; and
    mounting support means between each foundation ring and the slab for supporting the slab upon the foundation rings.

11. The method of claim 7 wherein the the step of selectively elevating and lowering portions of the slab includes the steps of:
    arranging a plurality of hydraulic cylinders to support the weight of the slab; and
    controlling the hydraulic pressure in each of the plurality of hydraulic cylinders.

12. The method of claim 11 wherein the controlling step includes the steps of:
    providing a flight deck control central processing unit;
    arranging a plurality of pumps so that each of the plurality of hydraulic cylinders is connected to a corresponding one of the plurality of pumps.

13. An aircraft carrier flight deck simulator for training pilots in aircraft carrier takeoff and landing procedures, comprising:
    flight deck means mounted to the earth for defining a first runway portion where an aircraft may be launched into flight and for defining a second runway portion where the aircraft may land as on an aircraft carrier;
    means for rotating the flight deck means in a substantially horizontal plane relative to the earth; and
    means for selectively controlling the elevation of portions of the flight deck means relative to the earth to simulate pitch and rolling motions of an aircraft carrier afloat at sea.

14. The aircraft carrier flight deck simulator of claim 13 wherein the means for controlling the angular orientation of the flight deck means comprises:
    a foundation ring formed as a generally circular track; and
    means mounted between the flight deck means and the foundation ring for supporting the flight deck means and moving it along the track.

15. The aircraft carrier flight deck simulator of claim 14 including:
    a plurality of concentric foundation rings; and
    support means mounted between each foundation ring and the flight deck means for supporting the flight deck means upon the foundation rings.

16. The aircraft carrier flight deck simulator of claim 12 wherein the means for selectively controlling the elevation of portions of the flight deck means includes:
    a plurality of hydraulic cylinders arranged to support the weight of the flight deck means; and
    means for controlling the hydraulic pressure in each of the plurality of hydraulic cylinders.

17. The aircraft carrier flight deck simulator of claim 16 wherein the controlling means includes:
    a flight deck control central processing unit; and
    a plurality of pumps arranged so that each of the plurality of hydraulic cylinders is connected to a corresponding one of the plurality of pumps.

18. A method for forming an aircraft carrier flight deck simulator for training pilots in aircraft carrier takeoff and landing procedures, comprising the steps of:
    mounting flight deck means to the earth for defining a first runway portion where an aircraft may be launched into flight and for defining a second runway portion where the aircraft may land as on an aircraft carrier;
    controlling the angular orientation of the flight deck means in a substantially horizontal plane relative to the earth; and
    controlling the elevation of portions of the flight deck means relative to the earth to simulate pitch and rolling motions of an aircraft carrier afloat at sea.

19. The method of claim 18 wherein the step of controlling the angular orientation of the flight deck means comprises the steps of:
    providing a foundation ring formed as a generally circular track; and
    supporting the flight deck means and moving it along the track.

20. The method of claim 19 including the steps of:

providing a plurality of concentric foundation rings; and supporting the flight deck means upon the plurality of concentric foundation rings.

21. The method of claim 12 wherein the step of selectively controlling the elevation of portions of the flight deck means includes the steps of:

providing a plurality of hydraulic cylinders arranged to support the weight of the flight deck means; and controlling the hydraulic pressure in each of the plurality of hydraulic cylinders.

22. The method of claim 21 wherein the step of controlling the pressure in each hydraulic cylinder includes the steps of providing a flight deck control central processing unit; and arranging a plurality of pumps so that each of the plurality of hydraulic cylinders is connected to a corresponding one of the plurality of pumps.

* * * * *